US010682953B1

(12) United States Patent
Mills et al.

(10) Patent No.: US 10,682,953 B1
(45) Date of Patent: Jun. 16, 2020

(54) DEVICE PROVIDING SENSORY FEEDBACK FOR VEHICLE PEDAL SELECTION

(71) Applicants: Evan W. Mills, Arlington, MA (US); Gary J. Mills, Arlington, MA (US)

(72) Inventors: Evan W. Mills, Arlington, MA (US); Gary J. Mills, Arlington, MA (US)

( * ) Notice: Subject to any disclaimer, the term of this patent is extended or adjusted under 35 U.S.C. 154(b) by 0 days.

(21) Appl. No.: 16/146,704

(22) Filed: Sep. 28, 2018

Related U.S. Application Data

(60) Provisional application No. 62/564,791, filed on Sep. 28, 2017.

(51) Int. Cl.
B60Q 9/00 (2006.01)
B60K 35/00 (2006.01)

(52) U.S. Cl.
CPC .............. B60Q 9/00 (2013.01); B60K 35/00 (2013.01); B60K 2370/193 (2019.05); B60Q 2400/00 (2013.01)

(58) Field of Classification Search
CPC ...... B60Q 9/00; B60Q 2400/00; B60K 35/00; B60K 2370/193
See application file for complete search history.

(56) References Cited

U.S. PATENT DOCUMENTS

| 4,941,263 | A * | 7/1990 | Hirshberg | E04H 6/426 33/264 |
| 6,450,277 | B1 * | 9/2002 | Kargilis | B44C 5/04 180/69.2 |
| 7,443,284 | B2 * | 10/2008 | Curtis | G08G 1/162 340/425.5 |
| 9,177,427 | B1 * | 11/2015 | Briggs | G07C 5/08 |
| 2003/0099025 | A1 * | 5/2003 | Abel | B60K 35/00 359/265 |
| 2003/0160736 | A1 * | 8/2003 | Faso | G02B 27/01 345/8 |
| 2005/0154505 | A1 * | 7/2005 | Nakamura | G01C 21/365 701/1 |
| 2007/0262880 | A1 * | 11/2007 | Curtis | G08G 1/162 340/901 |
| 2008/0018493 | A1 * | 1/2008 | Curtis | G08G 1/161 340/901 |
| 2008/0055285 | A1 * | 3/2008 | Ishikawa | G09F 21/045 345/204 |
| 2008/0291032 | A1 * | 11/2008 | Prokhorov | B60W 50/14 340/576 |
| 2009/0251304 | A1 * | 10/2009 | Saito | F02B 77/084 340/441 |
| 2010/0274435 | A1 * | 10/2010 | Kondoh | B60W 40/09 701/31.4 |

(Continued)

Primary Examiner — Joseph H Feild
Assistant Examiner — Rufus C Point
(74) Attorney, Agent, or Firm — Nutter McClennen & Fish LLP

(57) ABSTRACT

A device includes a cue generator for a vehicle. Like many vehicles, the vehicle has a windshield and a hood, a gas pedal and a brake pedal. The cue generator includes a light projector configured to project a distinct visual cue based on a type of engagement signal received. The cue generator is configured to receive a gas pedal engagement signal when the gas pedal is engaged, and a brake pedal engagement signal when the brake pedal is engaged. The device is configured to project the visual cue within a portion of the driver's peripheral field of view that corresponds to the hood of the car.

22 Claims, 11 Drawing Sheets

(56) References Cited

U.S. PATENT DOCUMENTS

| | | | |
|---|---|---|---|
| 2011/0128139 A1* | 6/2011 | Tauchi | B60K 35/00 340/439 |
| 2011/0260886 A1* | 10/2011 | Nagura | G08G 1/081 340/905 |
| 2012/0008048 A1* | 1/2012 | Sekine | G06T 19/006 348/566 |
| 2013/0076538 A1* | 3/2013 | Uno | G08G 1/096716 340/905 |
| 2013/0141250 A1* | 6/2013 | Mathieu | B60K 35/00 340/901 |
| 2016/0001780 A1* | 1/2016 | Lee | G06K 9/00791 701/48 |
| 2016/0084661 A1* | 3/2016 | Gautama | G01C 21/365 701/400 |
| 2016/0170485 A1* | 6/2016 | Naruse | B60K 35/00 345/8 |
| 2016/0200249 A1* | 7/2016 | Boyd | B60Q 9/00 340/459 |
| 2016/0375766 A1* | 12/2016 | Konet | G06K 9/00845 348/148 |
| 2017/0004641 A1* | 1/2017 | Ota | G06T 11/60 |
| 2017/0158056 A1* | 6/2017 | Takamatsu | G02B 27/0101 |
| 2017/0276938 A1* | 9/2017 | Nakashima | B60R 11/02 |
| 2017/0305349 A1* | 10/2017 | Naboulsi | B60R 1/025 |
| 2017/0316694 A1* | 11/2017 | Ryu | G08G 1/166 |
| 2017/0355265 A1* | 12/2017 | Fujita | B60W 50/029 |
| 2018/0105185 A1* | 4/2018 | Watanabe | G05D 1/0088 |
| 2018/0222491 A1* | 8/2018 | Miyahara | G07C 5/0825 |
| 2019/0061775 A1* | 2/2019 | Emura | G05D 1/0088 |
| 2019/0096297 A1* | 3/2019 | Cary | G09F 19/18 |
| 2020/0088996 A1* | 3/2020 | Fu | G02B 27/0103 |

\* cited by examiner

DEVICE PROVIDING SENSORY FEEDBACK FOR VEHICLE PEDAL SELECTION

PRIORITY

This application claims the benefit of U.S. Provisional Patent Application No. 62/564,791, filed Sep. 28, 2017, which is incorporated herein, in its entirety, by reference.

FIELD OF THE INVENTION

The invention generally relates to motor vehicles and, more particularly, the invention relates to providing cues to a driver that assist with determining which pedal has been engaged.

BACKGROUND OF THE INVENTION

Geriatric populations tend to suffer from a host of issues that make safe driving more difficult. For example, geriatric drivers may have stiff joints and muscles, difficulty seeing and hearing, slower reaction time and reflexes, and may be taking medication that affect driving ability.

SUMMARY OF VARIOUS EMBODIMENTS

In accordance with one embodiment of the invention, a device includes a cue generator for a vehicle. Like many vehicles, the vehicle has a windshield and a hood, a gas pedal and a brake pedal. The cue generator includes a light projector configured to project a distinct visual cue based on a type of engagement signal received. The cue generator is configured to receive a gas pedal engagement signal when the gas pedal is engaged, and a brake pedal engagement signal when the brake pedal is engaged. The device is configured to project the visual cue within a portion of the driver's peripheral field of view that corresponds to the hood of the car.

In some embodiments, the light may be projected through the windshield and onto a part of the hood of the vehicle that is within a driver's peripheral field of view. In some other embodiments, the light may be projected onto the windshield in the driver's field of view, for example, in the peripheral field of view. Alternatively, or additionally, some embodiments may have a dash-mounted display that shows the cues.

To that end, the cue generated for the gas pedal engagement signal may be oriented to the right of the cue generated for the brake pedal engagement signal, from the perspective of the driver. Among other things, the cue generated for the gas pedal engagement signal may be a green light, and the cue generated for the brake pedal engagement signal may be a red light, or vice-versa. The size of the visual cue generated may be adjusted.

In some embodiments, the cue is generated for the entirety of the time between the onset of the engagement signal and the end of the engagement signal. Alternatively, the cue may be generated initially at the onset of the engagement signal and for a predefined amount of time thereafter. The intensity of the projected cue may be correlated to how hard the pedal is engaged.

The cue may be redirected to the part of the hood of the vehicle within the driver's field of view (e.g., peripheral field of view) by an aspheric lens, and/or or the cue may be redirected to the part of the windshield of the vehicle within the driver's field of view or from a dash mounted display. In addition to the visual cue, a distinct auditory cue may also be provided on the basis of the type of engagement signal received.

In another embodiment, a system includes a vehicle having a windshield, a hood, and a driver's seat. The driver's seat may be adjusted to allow a driver to see a portion of the hood of the vehicle while seated. That portion defines a visible part of the hood. A brake pedal is operatively coupled to a brake pedal engagement system that produces a brake pedal engagement signal when the brake pedal is engaged. Similarly, a gas pedal is operatively coupled to a gas pedal engagement system that produces a gas pedal engagement signal when the gas pedal is engaged. A cue generator is configured to receive at least one of the brake pedal engagement signal or the gas pedal engagement signal. Furthermore, the cue generated is configured to display a visual cue on the basis of received engagement signal. The cue is displayed on the visible part of the hood of the vehicle, the windshield, and/or the dash mounted display.

In accordance with yet another embodiment, a method provides a vehicle having a windshield, a hood, and a driver's seat. The driver's seat is adjustable to allow a driver to see a portion of the hood of the vehicle while seated. That portion defines a visible part of the hood. The method also provides a brake pedal operatively coupled to a brake pedal engagement system that produces a brake pedal engagement signal when the brake pedal is engaged. Similarly, a gas pedal operatively coupled to a gas pedal engagement system that produces a gas pedal engagement signal when the gas pedal is engaged is provided. The method then receives at least one of the brake pedal engagement signal or the gas pedal engagement signal, and displays a visual cue on the basis of received engagement signal.

The cue may be displayed on the hood of the vehicle, the windshield, and/or a dash mounted display. In some embodiment, the cue is displayed on the hood of the vehicle within the driver's peripheral field of view. Additionally, or alternatively, the cue is displayed on the windshield of the vehicle. For example, the cue may be displayed on the part of the windshield that is within the driver's peripheral field of view. The cue may also be displayed on a monitor, such as a dash-mounted display.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a device provides a distinct cue (e.g., visual and/or auditory) to a driver depending on whether the gas or the brake pedal is engaged. This cue allows the driver to confirm that the appropriate pedal is engaged. The device provides visual assistance to drivers with proprioceptive limitations. The driver can adjust the cue's duration, intensity, and pattern. For example, the harder the brake and/or gas pedal is pressed, the greater the intensity of the cue 20. Details of illustrative embodiments are discussed below.

Figure 1:
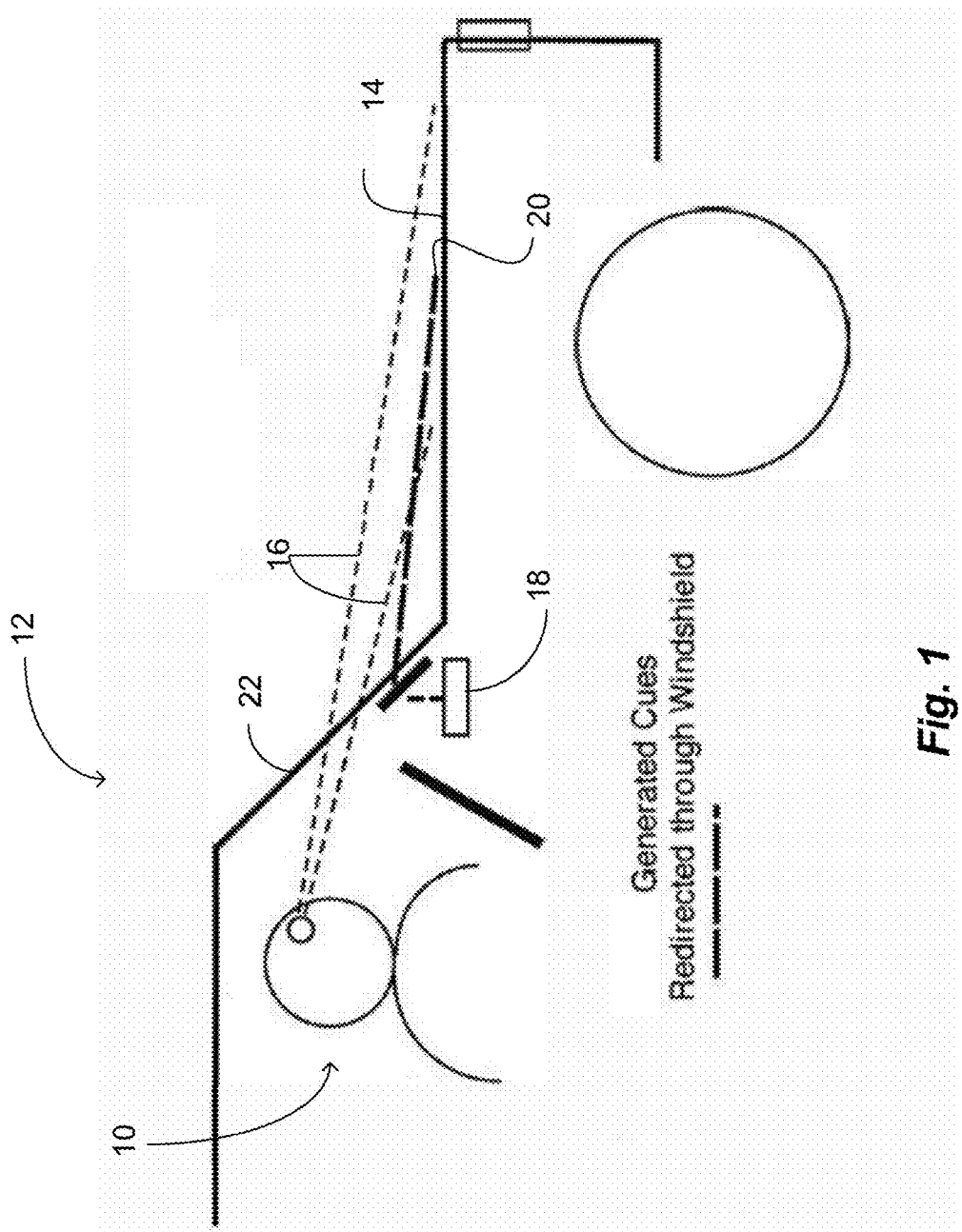
FIG. 1 schematically shows a driver in a car in accordance with illustrative embodiments of the invention.

FIG. 1 schematically shows a driver 10 in a vehicle 12 (e.g., car 12) having a cue generator 18 in accordance with illustrative embodiments of the invention. The driver 10, when seated in the driver's seat, has a field of view that includes a portion of a hood 14 of the car 12 (referred to as an peripheral field of view 16). While the driver 10 may look directly at the hood 14 of the car 12, generally, the driver 10 maintains their sight on the road. Accordingly, although the peripheral field of view 16 could in some instances be directly in the field of view of the driver, the term is used to refer to the field of view that is peripheral in the driver's 10 line of sight during normal driving conditions. The cue generator 18 receives signals from the vehicle 12 brake and gas pedal engagement systems (not shown in FIG. 1) when the respective pedal is engaged. In some embodiments, the cue generator 18 also receives signals from a clutch (e.g., in manual vehicles—not shown here).

Driving the car 12 safely requires that the driver 10 keep their eyes on the road to see, for example, traffic lights, road conditions, and traffic conditions. Thus, the driver 10 must generally keep their eyes on the road. Some drivers 10, geriatric drivers 10 for example, have difficulty with body position awareness. The aging process causes drivers 10 to be at risk for degenerative changes due to the natural process of aging. These changes may lead to limitations in activities of daily living as well as community participation. Currently, age-related hearing loss and visual loss is compensated in the form of hearing aids and eyeglasses.

Generally, it is more difficult to compensate for more complex systems, such as the vestibular and somatosensory systems. For example, individuals experiencing somatosensory age-related deterioration may present with balance deficits and sensation deficits. Sensory deterioration in both of these systems, in combination with the general lack of frequent mobility seen in older individuals, contribute to a deterioration of joint and limb position sense.

Current compensation methods taught by physical therapists apply visual cues directly to the automobile and require the driver 10 to move their visual field from the road ahead to see the position of their foot. Many cars are designed such that the driver cannot see their own feet. In illustrative embodiments, when the cue generator 18 receives a signal that a particular pedal is engaged, a cue 20 is generated.

Figure 2:
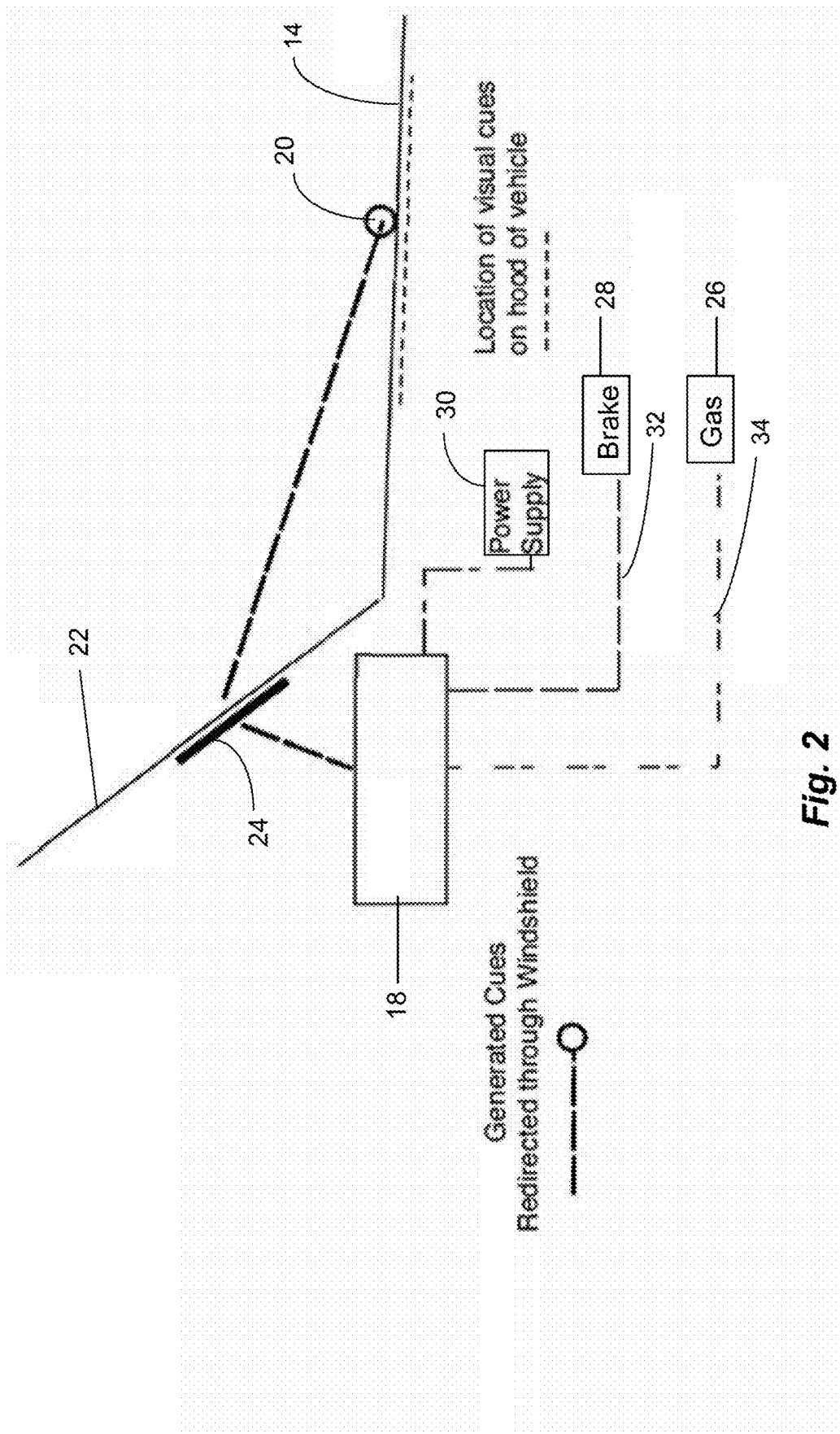
FIG. 2 schematically shows a visual cue generated by the cue generator of FIG. 1 in accordance with illustrative embodiments of the invention.

FIG. 2 schematically shows a visual cue 20 generated by the cue generator 18 of FIG. 1 in accordance with illustrative embodiments of the invention. As mentioned previously, the cue generator 18 generates the cue 20 (e.g., visual cue 20) when a pedal is engaged. The cue generator 18 may project the visual cue 20 onto a windshield 22 of the car 12 and within the driver's 10 peripheral field of view 16. Thus, in some embodiments, the road is not obstructed by the cue 20. Additionally, or alternatively, the cue generator 18 may project the visual cue 20 onto the hood 14 of the car 12. As shown in FIG. 2, an aspheric lens 24 may redirect the visual cue 20 towards the hood 14 (e.g., through the windshield 22). In some embodiments, the aspheric lens 24 is mounted to the windshield 22.

The cue generator 18 receives signals from the vehicle's 12 brake 28 and/or gas pedal 26 when they become engaged. Those signals are converted to visual (and/or audio) cues 20. In some embodiments, the visual cue(s) 20 is generated by projecting a light source to the aspheric lens 24 attached to the vehicle's 12 windshield 22. The aspheric lens 24 directs the cue to a location on the hood 14 of the vehicle 12 in the forward line of sight of the driver in a heads-up display (HUD).

As described above, illustrative embodiments of the signal converter/cue generator 18 are secured to the top of the vehicle's 12 dash, are integral to the dash, and/or have an aspheric lens 24 attached to the windshield 22. A power supply 30 may supply power to the cue generator 18 from the vehicle's 12 battery system. Additionally, or alternatively, the power supply 30 may be separate from the vehicle's 12 battery system.

Figure 3:
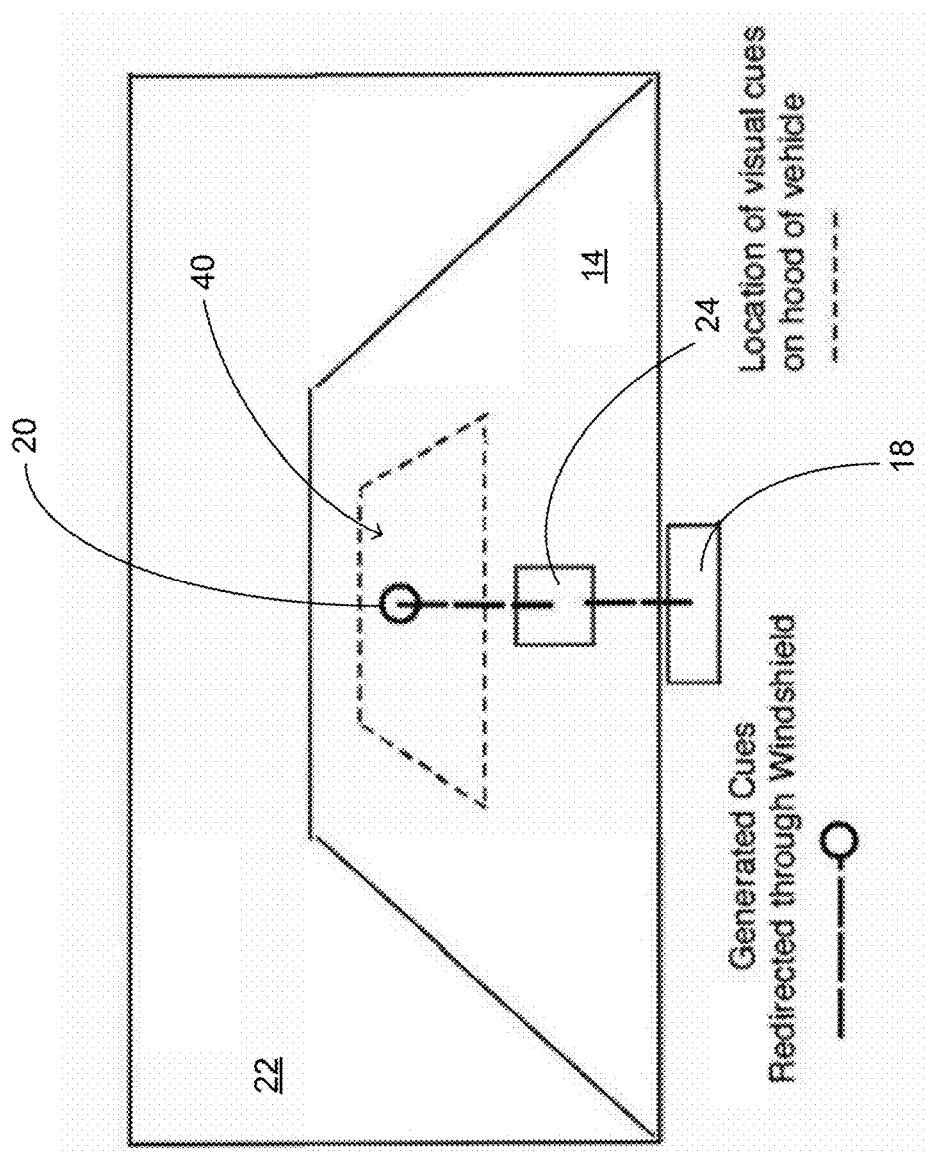
FIG. 3 schematically shows a driver's perspective of the heads-up display of FIG. 2 in accordance with illustrative embodiments of the invention.
Figure 6:
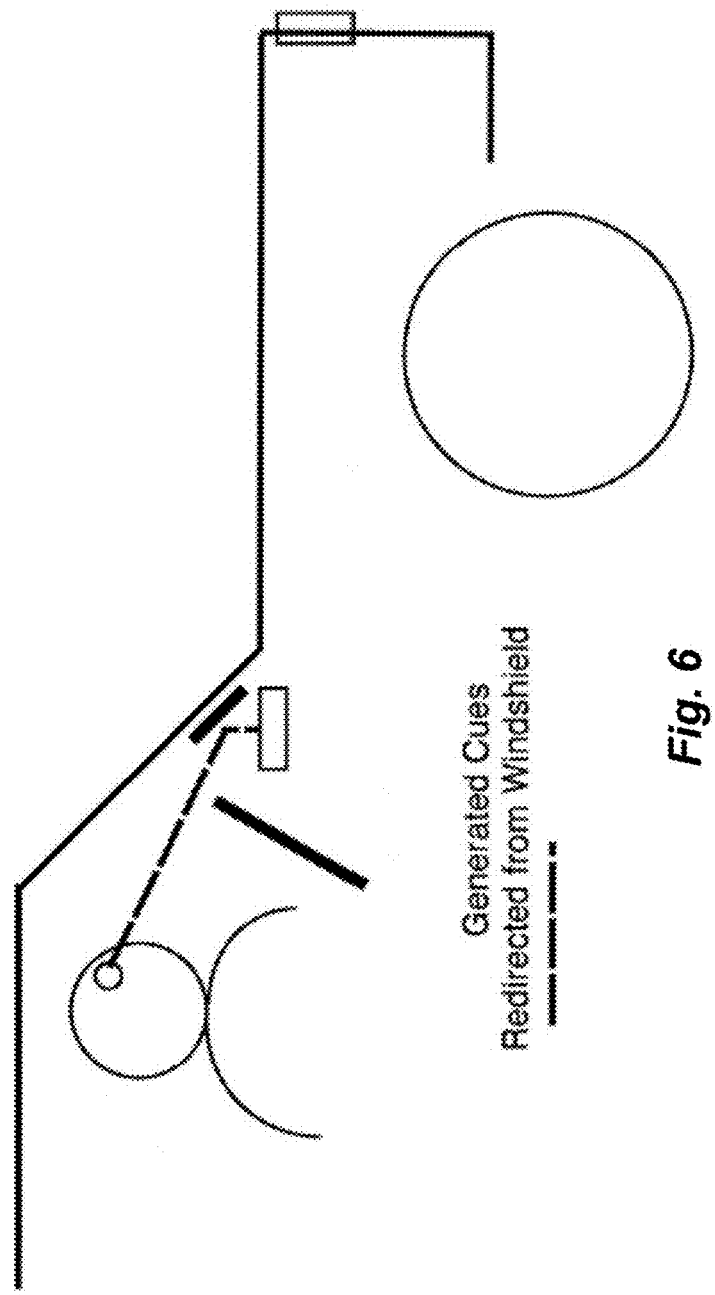
Figure 7:
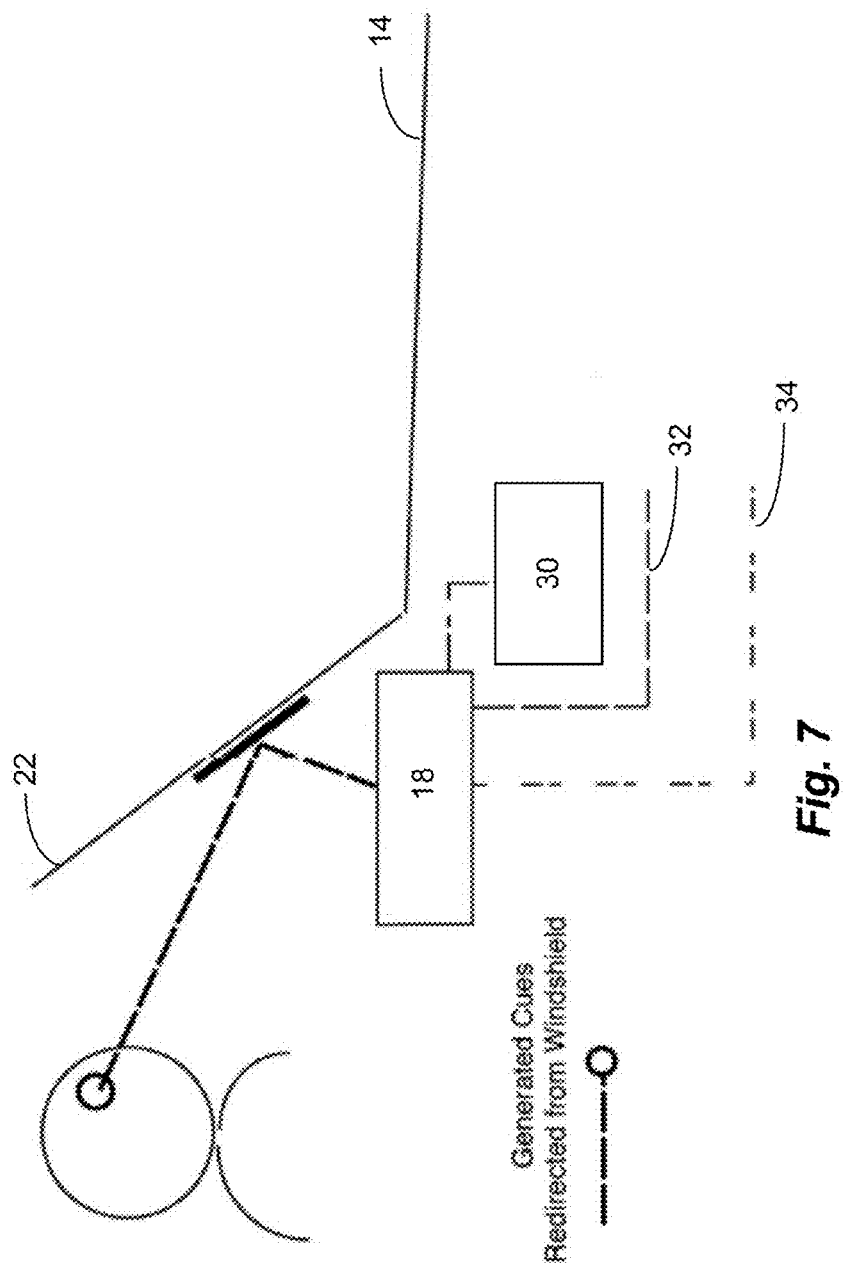
FIG. 7 schematically shows details of the cue generator of FIG. 6 in accordance with illustrative embodiments of the invention.
Figure 8:
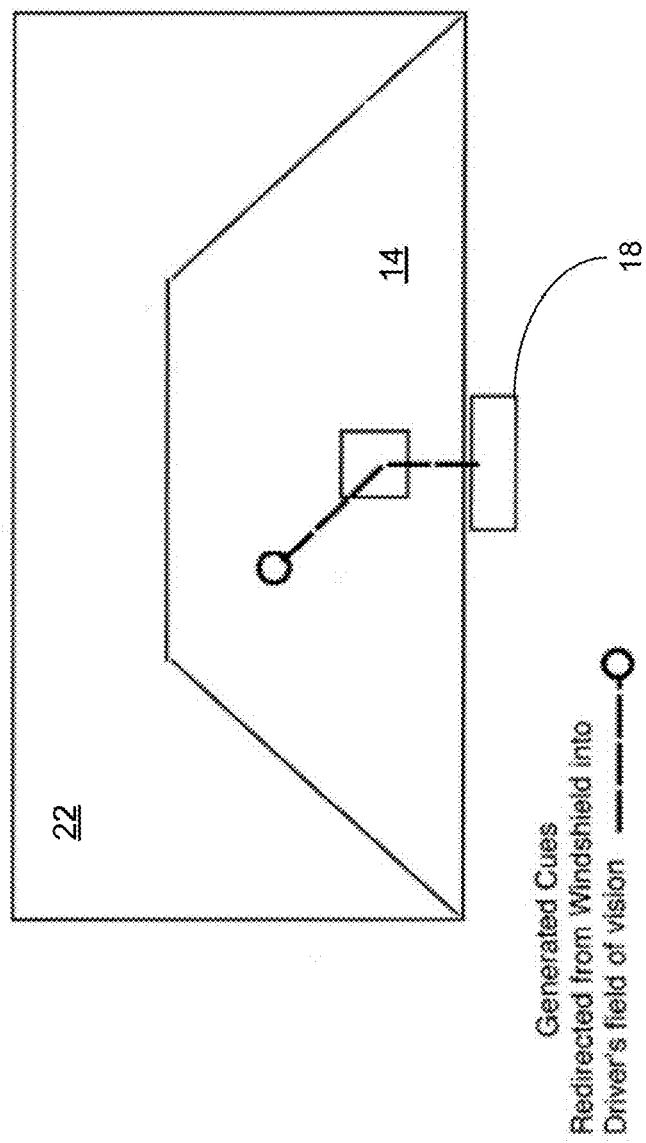
FIG. 8 schematically shows a driver's perspective of the heads-up display of FIG. 6 in accordance with illustrative embodiments of the invention.

FIG. 3 schematically shows the driver's 10 perspective of the heads-up display 40 in accordance with illustrative embodiments of the invention. Both the cue 20, which is directly on the windshield 22, e.g., as shown in FIGS. 6-8) and/or projected on the hood 14 (e.g., via aspheric lens 24) are referred to herein as the heads-up display 40. If the driver 10 steps on the gas pedal 26, a green light cue 20 may appear in the heads-up display 40. Additionally, or alternatively, if the driver 10 steps on the brake pedal 28, a red light cue 20 may appear in the heads-up display 40. A person of skill in the art understands that a number of different visual cues 20 may be used (e.g., text, color, shapes, etc.).

In some embodiments, the cue 20 is projected and/or displayed within the field of view of the driver 10. Specifically, the cue 20 may be projected in the peripheral field of view 16 (peripheral in the sense that this is the portion of the hood 14 of the car 12 that the driver 10 sees while driving the car 12—thus the driver 10 does not need that portion of their field of view to drive safely). In addition to not obstructing portions of the road, the peripheral positioning of the cue 20 is not as likely to annoy drivers 10, which results in better usage (e.g., drivers 10 won't turn it off). It should be understood that the term "peripheral field of view 16" is with reference to the view point of the driver 10 while driving. Thus, if the driver 10 looks outside the window or at the cue 20, the position of the cue 20 may not move (e.g., it does not move to stay in the driver's 10 "peripheral field of view"), but may still be considered to be in the driver's 10 peripheral field of view. In some embodiments, however, the cue 20 may move to stay within the field of view of the driver 10, even if the driver 10 is looking elsewhere (e.g., by determining field of view via head and/or optical tracking using sensors, or cameras, etc.).

The cue generator 18 and/or the projection mechanism 24 (e.g., lens 24) may be configured to project and/or display the cue 20 in a position on the windshield 22 and/or the hood 14 that is within the driver's 10 peripheral field of view 16 while driving. To that end, illustrative embodiments may have a sensor that detects the location of the driver's eyes, head, and/or height and provides that information to the cue generator 18. Furthermore, once the location of the driver's eyes, head, and/or height is detected, it is possible to calculate what portion of the hood 14 of the vehicle 12 is visible to the driver 10, for example, based on the model of the car 12, the placement of the steering wheel and/or the position of the dashboard relative to the driver 10 location. Accordingly, the heads-up display 40 may be adjusted to project the cue 20 within the driver's 10 peripheral field of view 16 (e.g., on the hood from the driver's 10 perspective). Accordingly, the cue 20 does not obstruct the road from the driver's 10 perspective. In some other embodiments, the location of the cue 20 in the heads-up display 40 is manually adjustable.

Figures 4A, 4B, 4C:
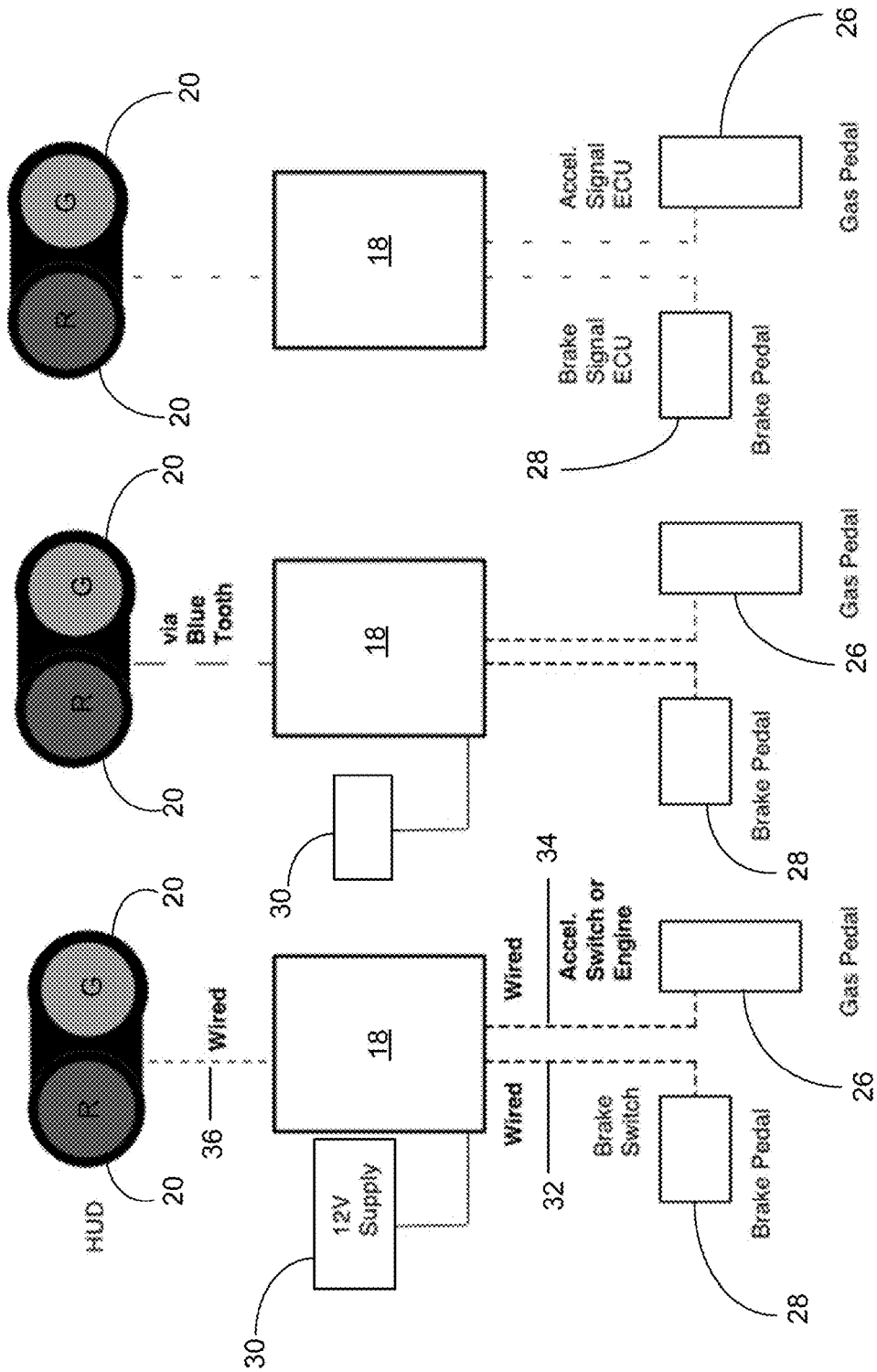
FIGS. 4A-4C schematically shows the cue generator receiving input signals from the pedals and outputting a cue signal in accordance with illustrative embodiments of the invention.

FIGS. 4A-4C schematically show the cue generator 18 receiving input signals 32 and 34, respectively, from the pedals 28 and 26, and outputting a cue signal 36 in accordance with illustrative embodiments of the invention. In some embodiments, the gas pedal engagement 34 signal 34 is connected to the cue generator 18 from either the vehicle's 12 engine air intake/vacuum system or electronic control unit ("ECU," e.g., engine control unit). Additionally, or alternatively, the brake pedal engagement signal 32 may be connected to the cue generator 18 from either the brake light switch or ECU.

The brake pedal engagement signal 32 may be generated with brake pedal 28 engagement via the vehicle 12 ECU, vehicle 12 brake by wire, vehicle brake switch 12, and/or a new/additional brake switch. The gas pedal engagement signal 34 may be generated with gas pedal 26 engagement via vehicle 12 ECU, vehicle gas by wire, vehicle fuel injection signal, vehicle fuel control switch, vehicle 12 engine air intake/vacuum system, and/or a new/additional fuel control switch.

Depending on the year and model of vehicle 12, the cue generator 18 may use a wired connection (as shown in FIG. 4A) or a Bluetooth connection (as shown in FIG. 4B). Furthermore, as shown in FIG. 4C, the cue generator 18 may be integrated into the car by the car manufacturer. Accordingly, some embodiments (e.g., in FIGS. 4A-4B) have a dedicated power supply 30, which may be sold with the cue generator 18 and installed in vehicles 12 as an aftermarket part. However, illustrative embodiments may have the cue generator 18 integrated into, and draw power from, the vehicle 12 (e.g., FIG. 4C).

Figure 5:
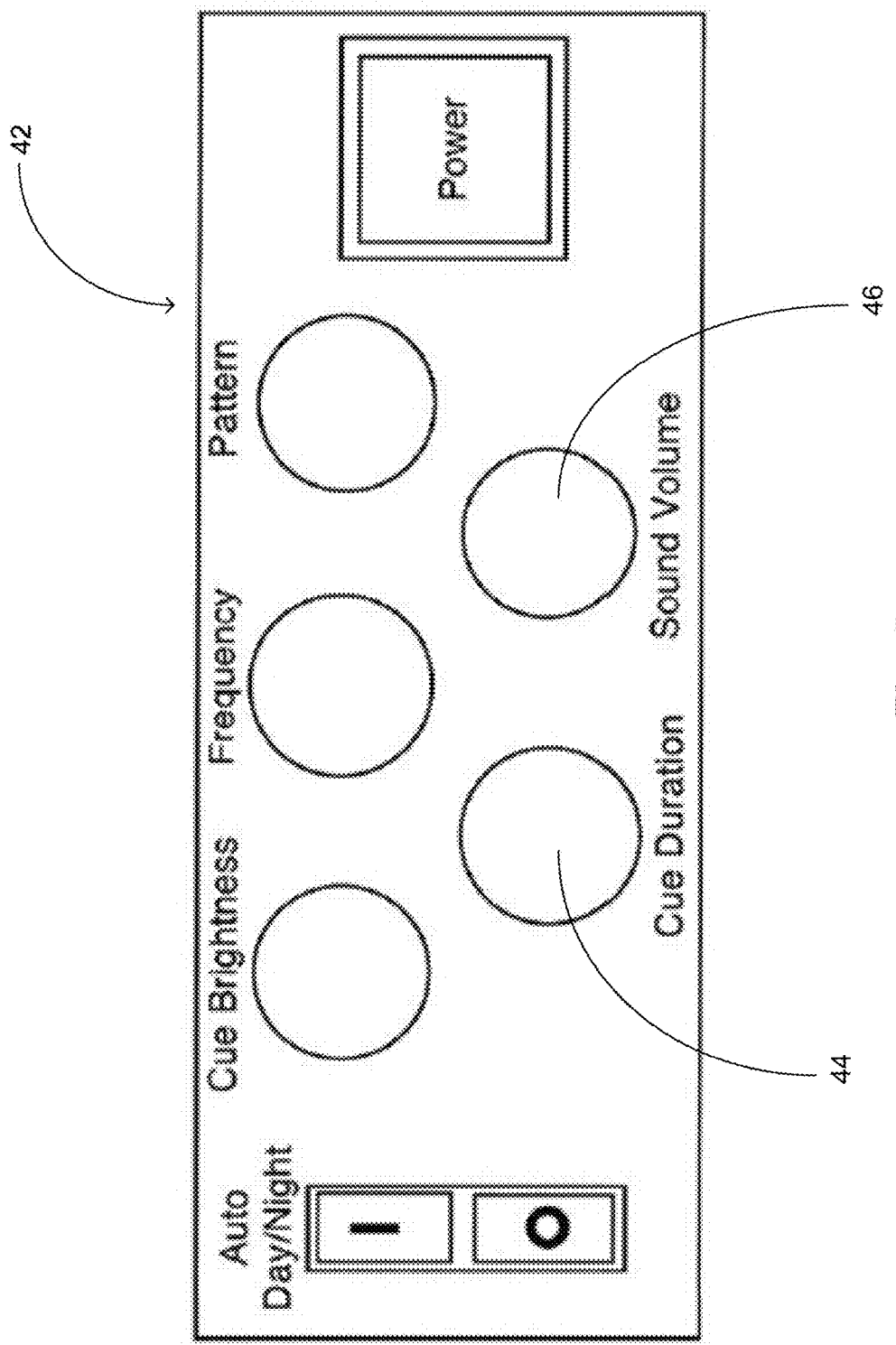
FIG. 5 schematically shows a cue settings interface in accordance with illustrative embodiments of the invention FIG. 6 schematically shows a driver in a car using a windshield heads-up display in accordance with illustrative embodiments of the invention.

FIG. 5 schematically shows a cue settings interface 42 in accordance with illustrative embodiments of the invention. In some embodiments, the visual cues 20 are unique for each pedal (e.g., brake and gas) and are offset to align with each pedals' location, e.g., gas pedal 26 cue on right and brake pedal 28 cue on left from the perspective of the driver 10.

In some embodiments, the cue generator 18 may send the cue 20 at the moment of initial engagement of the pedal 26 or 28 and continue sending the signal until disengagement. Additionally, or alternatively, the cue 20 may be sent at the time of initial engagement and then for an additional cue 20 duration, e.g., adjustable via cue duration knob 44. Additionally, or alternatively, the frequency of the cue 20 may be adjusted, e.g., every 3 seconds. Different versions of the cue 20 may be configured based on driver 10 age and configuration of vehicle 12.

Furthermore, the driver may adjust the cue's duration, intensity, pattern and brightness. Cues 20 may include visual lights (LEDS), visual colors, visual patterns or/and sounds/tones. In some embodiments, the type of cues 20, duration of cues 20, pattern of cues 20, frequency of cues 20, and/or intensity of cues 20 (brightness/volume) is adjustable. Furthermore, automatic settings can be adjusted for the intensity of visual cues 20 based on time of day (e.g., day time v. night time intensity). The ambient noise of sound cues 20 may also be adjustable using a sound volume knob 46.

In some embodiments, patterns projected include geometric patterns (e.g., X-pattern for brake and an arrow for gas), and texture patterns (e.g., granular lines, bars, or circles v. crisp lines, bars, or circles for gas and brake, respectively).

In some embodiments, instead of projecting the cue 20 (e.g., onto the hood 14 or onto the windshield 22) an optional display screen may display the cue 20. FIG. 8 schematically shows a driver's perspective of the heads-up display of FIG. 6 in accordance with illustrative embodiments of the invention.

Illustrative embodiments provide a visual and/or audio cue to the driver 10 when either the gas or brake pedal is engaged. To that end, the sound volume knob 46 allows adjustment of the audio cue 20. To that end, illustrative embodiments may connect with the car speaker system (e.g., via Bluetooth, or auxiliary cable), and/or may have an independent sound system. This cue 20 lets the driver know whether they have engaged the desired pedal. This device provides visual assistance to drivers with proprioceptive limitations.

The intensity of the visual cue can be aligned to some other variable, such as, the intensity of the gas pedal application (e.g., a panic scenario when the driver incorrectly and forcefully applies the gas pedal when the desire is to apply the brake pedal). Thus, the device provides the driver a visual cue that the incorrect pedal has been engaged.

It should be understood that illustrative embodiments of the invention provide safer driving of geriatric populations. Other advantages include reassurance of correct foot placement during driving situations that require immediate braking.

In illustrative embodiments, an engagement signal is generated with brake pedal engagement, and engagement signal is generated with gas pedal engagement, an engagement signal is generated with brake pedal force degree, an engagement signal is generated with gas pedal force degree, a HUD (heads-up display) device converts pedal engagement engagement signal to cues, a HUD device presents each cue type to driver, and a HUD device presents each cue on vehicle windshield via reflexive patch and/or lens.

Figure 9:
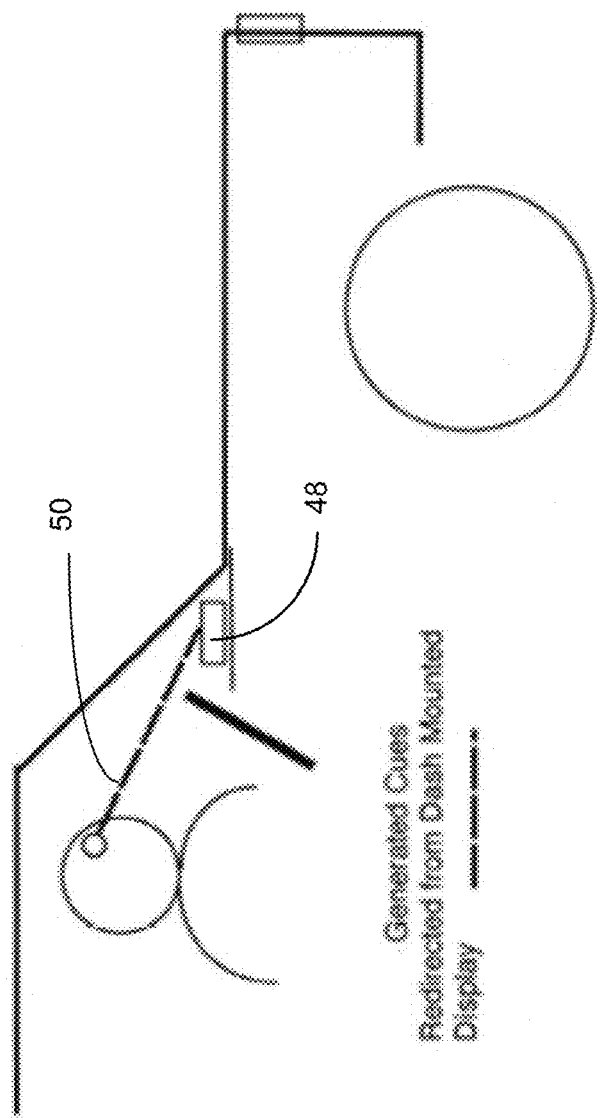
FIG. 9 schematically shows a driver in a car using a dash-mounted display in accordance with illustrative embodiments of the invention.
Figure 10:
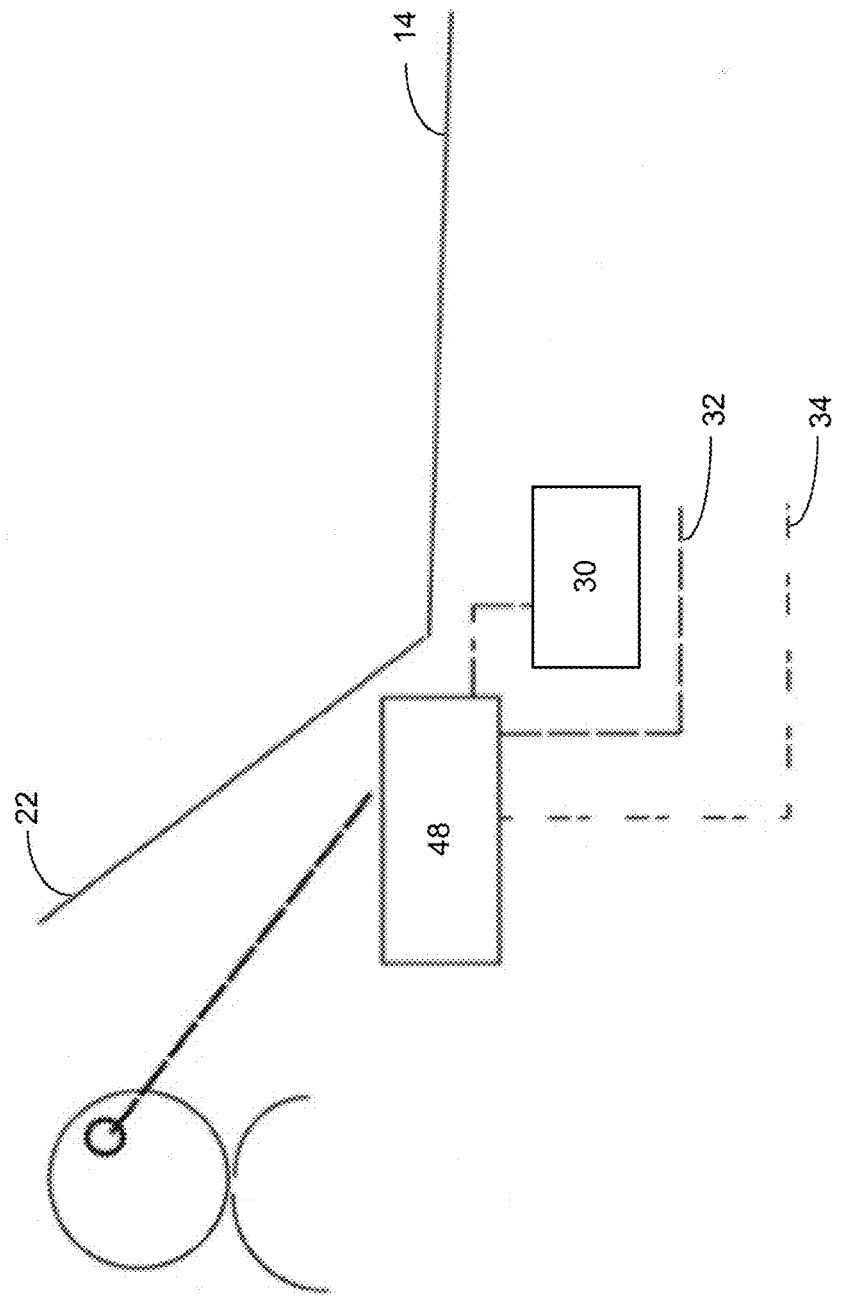
FIG. 10 schematically shows details of the cue generator of FIG. 9 in accordance with illustrative embodiments of the invention.
Figure 11:
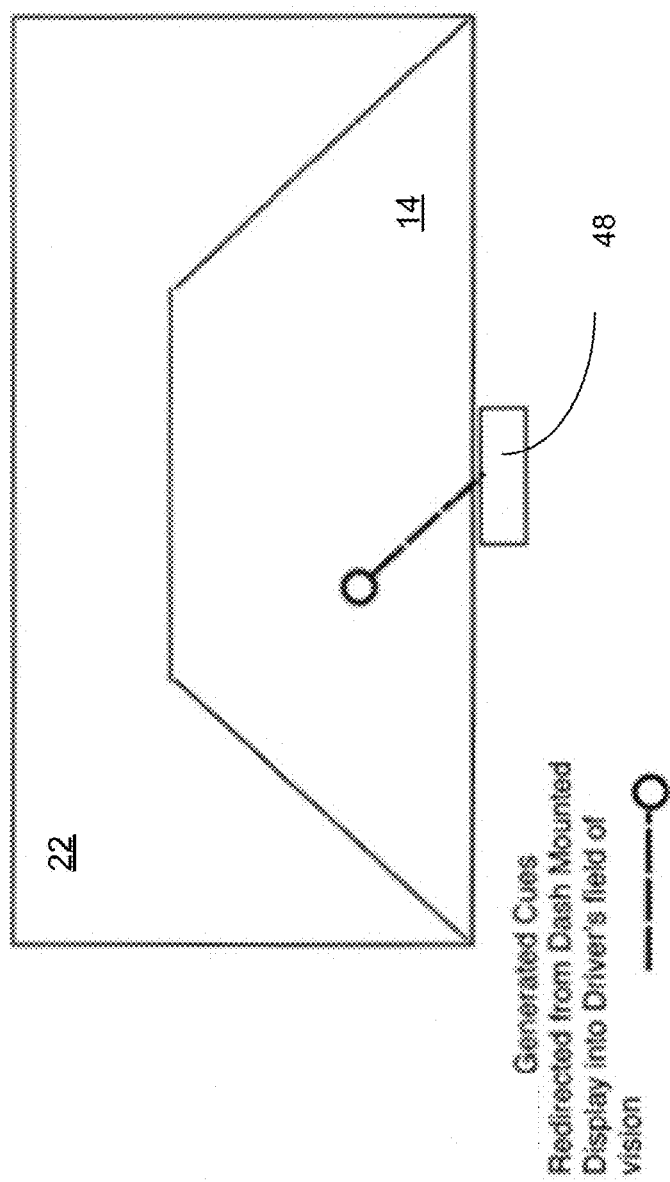
FIG. 11 schematically shows a driver's perspective of the heads-up display of FIG. 9 in accordance with illustrative embodiments of the invention.

It should further be understood that the various embodiments and functionalities described above with reference to the cue 20 generated on the hood 14 (e.g., FIGS. 1-5) are also applicable to embodiments where the cue 20 is generated on the windshield 22 (e.g., FIGS. 6-8), and furthermore are applicable to the cue 20 generated on, or redirected 50 from, a mounted display 48 (e.g., FIGS. 9-11). For example, the windshield 22 generated cues 20 and the mounted display 48 may be within the driver's 10 peripheral field of view and have the various cue 20 variables described above (e.g., duration, intensity, shape, pattern, etc.). In some embodiments, regardless of where the cue 20 is physically generated (e.g., windshield, hood, display, etc.), the cue 20 is seen from the perspective of the driver as overlapping the hood 14. In such a case, the cue 20 is in the portion of the driver's 10 field of view that corresponds to the hood 14 of the car 12.

Although the above discussion discloses various exemplary embodiments of the invention, it should be apparent that those skilled in the art can make various modifications that will achieve some of the advantages of the invention without departing from the true scope of the invention.

What is claimed is:

1. A device comprising:
   a cue generator for a vehicle, the vehicle having a windshield and a hood, the cue generator comprising a light projector configured to project a distinct visual cue based on a type of engagement signal received,
   the cue generator configured to receive a plurality of signals, the signals including:
   a gas pedal engagement signal when a gas pedal of the vehicle is engaged, and
   a brake pedal engagement signal when the brake pedal of the vehicle is engaged;
   wherein the cue generator is configured to generate two distinct visual cues: (1) a gas pedal engagement cue in response to receiving the gas pedal engagement signal, and (2) a brake pedal engagement cue in response to receiving the brake pedal engagement signal,
   the device configured to display the generated distinct visual cue within a portion of the driver's peripheral field of view that includes the hood of the car.

2. The device as defined by claim 1, further comprising a sensor configured to detect and calculate the location of the driver's peripheral field of view and to control the light projector to position the visual cue in the driver's peripheral field of view.

3. The device as defined by claim 1, wherein the cue generated for the gas pedal engagement signal is a green light and the cue generated for the brake pedal engagement signal is a red light, the green light being oriented to the right of the red light from the perspective of the driver.

4. The device as defined by claim 1, wherein the cue is projected on the windshield.

5. The device as defined by claim 1, wherein the cue is generated initially at the onset of the engagement signal and for a predefined amount of time thereafter.

6. The device as defined by claim 1, wherein the intensity of the projected cue is correlated to how hard the pedal is engaged.

7. The device as defined by claim 1, further comprising an aspheric lens that redirects the signal to the hood of the vehicle within the driver's peripheral field of view.

8. The device as defined by claim 1, further comprising an auditory cue based on the type of engagement signal received.

9. The device as defined by claim 1, wherein the size of the visual cue is adjustable.

10. A system comprising:
    a vehicle having a windshield, a hood, and a driver's seat, the driver's seat being adjustable to allow a driver to see a portion of the hood of the vehicle while seated, the portion defining a visible part of the hood;
    a brake pedal operatively coupled to a brake pedal engagement system that produces a brake pedal engagement signal when the brake pedal is engaged;
    a gas pedal operatively coupled to a gas pedal engagement system that produces a gas pedal engagement signal when the gas pedal is engaged; and
    a cue generator configured to receive a plurality of signals, the signals including:
    a gas pedal engagement signal when a gas pedal of the vehicle is engaged, and
    a brake pedal engagement signal when the brake pedal of the vehicle is engaged, and further configured to generate two distinct visual cues on the portion:
    (1) a gas pedal engagement cue in response to receiving the gas pedal engagement signal, and
    (2) a brake pedal engagement cue in response to receiving the brake pedal engagement signal.

11. The system as defined by claim 10, wherein the visual cue generated for the gas pedal engagement signal is oriented to the right of the cue generated for the brake pedal engagement signal, from the perspective of the driver.

12. The system as defined by claim 10, wherein the visual cue generated for the gas pedal engagement signal is a green light and the cue generated for the brake pedal engagement signal is a red light.

13. The system as defined by claim 10, wherein the visual cue is projected for the entirety of the time between the onset of the engagement signal to the end of the engagement signal.

14. The system as defined by claim 10, wherein the cue is generated initially at the onset of the engagement signal and for a predefined amount of time thereafter.

15. The system as defined by claim 10, wherein the intensity of the cue is correlated to how hard the pedal is engaged.

16. The system as defined by claim 10, further comprising an aspheric lens that redirects the signal to the hood of the vehicle within the driver's peripheral field of view.

17. The system as defined by claim 10, wherein the size of the visual cue is adjustable.

18. A method comprising:
    providing a vehicle having a windshield, a hood, and a driver's seat, the driver's seat being adjustable to allow a driver to see a portion of the hood of the vehicle while seated, the portion defining a visible part of the hood;
    providing a brake pedal operatively coupled to a brake pedal engagement system that produces a brake pedal engagement signal when the brake pedal is engaged;
    providing a gas pedal operatively coupled to a gas pedal engagement system that produces a gas pedal engagement signal when the gas pedal is engaged; and
    receiving at least one of the brake pedal engagement signal or the gas pedal engagement signal; and
    displaying a visual cue, based on the received engagement signal, in the driver's peripheral field of view that includes the hood of the vehicle.

19. The method as defined by claim 18, wherein the cue is projected on the windshield of the vehicle.

20. The method as defined by claim 19, wherein the part of the windshield is within the driver's peripheral field of view.

21. The method as defined by claim 18, wherein the cue is displayed on a monitor.

22. The method as defined by claim 18, wherein the monitor is a dash-mounted display.

\* \* \* \* \*